(12) United States Patent
Deardurff et al.

(10) Patent No.: US 6,652,636 B2
(45) Date of Patent: Nov. 25, 2003

(54) PHTHALOCYANINE CYAN DYE WITH APPENDED CHELATING ARM TO INDUCE MONOMER DYE FORMATION AND INCREASED CHROMA

(75) Inventors: Larrie A Deardurff, Corvallis, OR (US); Hiang P Lauw, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 09/895,423

(22) Filed: Jun. 29, 2001

(65) Prior Publication Data

US 2003/0041775 A1 Mar. 6, 2003

(51) Int. Cl.$^7$ .................. C09D 11/02; C09B 47/04; C09B 62/00; C09B 67/00; C07D 482/22
(52) U.S. Cl. .................. 106/31.49; 106/31.47; 540/124; 540/125; 540/127; 540/122
(58) Field of Search .................. 106/31.49, 31.47; 540/122, 124, 125, 127

(56) References Cited

U.S. PATENT DOCUMENTS

| | | | |
|---|---|---|---|
| 4,199,509 A | 4/1980 | Irvine et al. ............ 260/314.5 |
| 4,221,606 A | 9/1980 | Funatsu et al. | |
| 4,393,005 A | 7/1983 | Patsch et al. | |
| 4,632,703 A | 12/1986 | Koike et al. ............ 106/31.49 |
| 4,665,165 A | * 5/1987 | Wald ......................... 540/124 |
| 4,732,615 A | 3/1988 | Kawashita et al. ....... 106/31.49 |
| 5,123,960 A | 6/1992 | Shirota et al. ............ 106/31.49 |
| 5,282,894 A | * 2/1994 | Albert et al. ............ 106/31.46 |
| 5,296,023 A | 3/1994 | Gregory et al. .......... 106/31.49 |
| 5,472,490 A | 12/1995 | Sawamura et al. .......... 106/413 |
| 5,501,710 A | 3/1996 | Wunderlich .................. 8/402 |
| 5,563,260 A | 10/1996 | Kaul et al. ................. 540/133 |
| 5,704,969 A | 1/1998 | Kanaya et al. ............ 106/31.48 |
| 5,759,254 A | * 6/1998 | Macpherson et al. ....... 106/410 |
| 5,882,390 A | * 3/1999 | Nagai et al. ............ 106/31.49 |
| 5,948,154 A | 9/1999 | Hayashi et al. .......... 106/31.48 |
| 6,124,451 A | 9/2000 | Healy et al. | |
| 6,190,422 B1 | * 2/2001 | Carr ......................... 8/445 |
| 6,379,441 B1 | * 4/2002 | Kanaya et al. .......... 106/31.49 |
| 6,508,873 B1 | * 1/2003 | Shawcross et al. ...... 106/31.49 |

FOREIGN PATENT DOCUMENTS

| | | |
|---|---|---|
| EP | 0418792 | 3/1991 |
| EP | 0519395 | 12/1992 |
| EP | 0719847 | 7/1996 |
| JP | 61002772 | 1/1986 |
| JP | 2000239584 | 9/2000 |

OTHER PUBLICATIONS

Sastre, Angela, et al., "Synthesis of Novel Unsymmetrically Substituted Push–Pull Phthalocyanines," J. Org. Chem., vol. 61, 1996, pp. 8591–8597, no month available.

Knor, Gunther, "Synthesis and Solution Spectral Properties of Antimony (III) Phthalocyanine and Dihydroxoantimony(V) Phthalocyanine Complexes," Inorg. Chem., vol. 35, 1996, pp. 7916–7918, no month available.

Ng, Anthoncy C.H., et al., "Synthesis and Photophysical Properties of Nonaggregated Phthalocyanines Bearing Dendritic Substituents," Macromolecules, vol. 32, 1999, pp. 5292–5298, no month available.

Sastre, Angela, et al., "Phthalocyanine–Azacrown–Fullerene Multicomponent System: Synthesis, Photoinduced Processes, and Electrochemistry," Org. Lett., vol. 1, No. 11, 1999, pp. 1807–1810, no month available.

Maya, Eva M., et al., "Synthesis of Novel Push–Pull Unsymmetrically Substituted Alkynyl Phthalocyanines," J. Org. Chem., vol. 65, 2000, pp. 2733–2739, no month available.

Contakes, Stephen M., et al., "Complexes of Phthalocyanines and Metallophthalocyanines," Organometallics, vol. 19, 2000, pp. 4767–4774, no month available.

* cited by examiner

Primary Examiner—Helene Klemanski

(57) ABSTRACT

The novel phthalocyanine cyan dye of the formula (I)

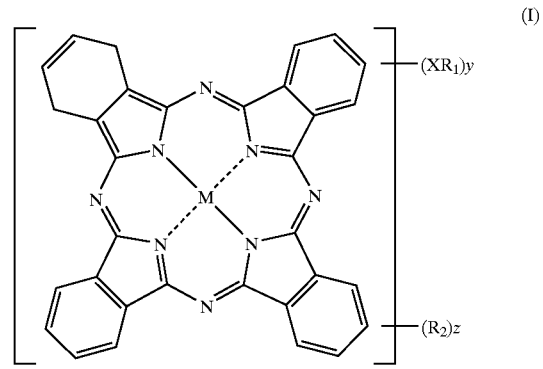

in which

M represents an ion of a metal selected from the group consisting of Cu, Fe, Co, Mg, Mn, Sn and Ni, X represents a linear compound having 6–10 atoms in length containing C, O, and/or N, $R_1$ represents pyridine, imidazole, sulfide, thiol, phenol, benzene, benzaldehyde, pyrimidine, pyrizine, triazine, thiazole, oxazole, pyridone, pyrone, pyrole, thiophene, furan, pyran, dioxane, and morpholine, and derivatives thereof, $R_2$ represents an atom or chemical group that imparts water solubility to the phthalocyanine cyan dye, and y and z each independently represent an integer of 1 to 3 satisfying the relation of $2 \leq y+z \leq 4$.

Ink formulations containing at least one dye of the formula (I) and methods for ink jet printing with inks containing the phthalocyanine cyan dyes of formula (I).

11 Claims, No Drawings

PHTHALOCYANINE CYAN DYE WITH APPENDED CHELATING ARM TO INDUCE MONOMER DYE FORMATION AND INCREASED CHROMA

FIELD OF THE INVENTION

The present invention relates to an ink composition for ink jet printing and to a method of printing using the same. More particularly, the present invention relates to a phthalocyanine derivative, to an ink composition comprising the same, and to a method for forming color images using the ink compositions and phthalocyanine derivatives of the present invention.

BACKGROUND OF THE INVENTION

Ink compositions are required to have certain overall properties and performance characteristics. Specifically, they are not only required to have excellent color reproducibility, but also required to produce images that are excellent in water resistance and light resistance. Additionally, in ink jet printing in which droplets of an ink composition are ejected on a recording medium to form an image thereon, the ink composition is required to have more stringent properties than those required for ordinary writing utensils such as fountain pens and ball-point pens. For instance, the ink composition is required to have a proper viscosity and a suitable surface tension, to possess suitable stability and to not cause clogging in a nozzle.

Ink jet printers produce color images by using, in general, yellow, magenta and cyan ink compositions, and optionally a black ink composition. By superimposing these ink compositions, other colors are developed. In such color printing, each ink composition is required to be highly reproducible in its own color. In addition to this, these ink compositions are required to be excellent in reproducibility in red, green, and blue, and optionally black colors which are developed by superimposing ink compositions one over another.

In general, many of these properties required for the ink composition for use in ink jet printing can be satisfied by an aqueous ink composition comprising a water-soluble dye water and a water-soluble organic solvent. The properties of printed images, such as color tone, water resistance and light resistance, are highly dependent on the dye used. It has been tried to utilize various dyes.

Ink compositions containing a phthalocyanine derivative as a cyan or blue dye are known in the art. The use of various phthalocyanine derivatives is disclosed, for example, in U.S. Pat. No. 5,296,023, in U.S. Pat. Nos. 5,704,969, 4,632,703, 5,123,960, and in Japanese Laid-Open Patent Publications Nos. 2772/1986, 149758/1987, 190273/1987 and 200883/1991. However, there is yet room for improvement in these ink compositions containing a phthalocyanine derivative.

In view of the foregoing shortcomings, there is a need in the art for phthalocyanine-containing dyes and ink compositions having desirable performance characteristics (e.g., high chroma, as well as having good ink quality, pen reliability, color tone, water resistance and light resistance). There is a further need for such dyes and ink compositions which possess enhanced performance characteristics, do not require addition of high concentrations of external bases or organic compounds to the ink.

SUMMARY OF THE INVENTION

The present invention relates to novel phthalocyanine cyan dyes, ink formulations containing these dyes and methods for ink jet printing with the inks containing the phthalocyanine cyan dyes. The invention provides phthalocyanine cyan dyes having one or more appended chelating arm(s), which induces monomer dye formation and increased chroma. According to the present invention, there is provided phthalocyanine dyes represented by the following formula I:

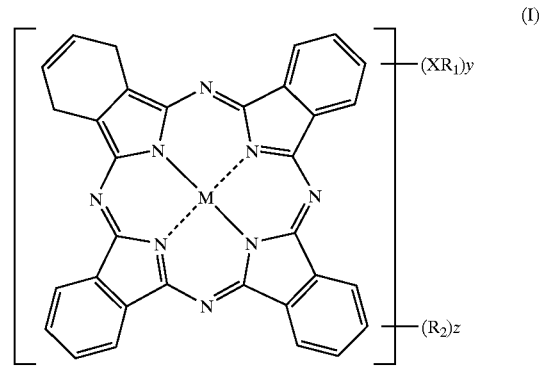

wherein
M represents an ion of a metal selected from Cu, Fe, Co, Mg, Mn, Sn and Ni, X represents a linear compound having 6–10 atoms in length and containing C, O, and/or N, $R_1$ represents pyridine, imidazole, sulfide, thiol, phenol, benzene, benzaldehyde, pyrimidine, pyrizine, triazine, thiazole, oxazole, pyridone, pyrone, pyrole, thiophene, furan, pyran, dioxane, and morpholine, and derivatives thereof, $R_2$ represents $SO_3H$, OH, COOH, $NH_2$, $COONHR_3$, $COONR_3$ (where $R_3$ is a substituted or unsubstituted alkyl group that contains a water solubilizing group (such as, e.g., COOH, OH, $SO_3H$, etc.) and the corresponding salts of COOH and $SO_3H$ groups (e.g., $Na^+$, $K^+$, $NH_4^+$); in addition, these water solubilizing groups can be of the formula Y-X, where Y represents an alkyl group and X represents $SO_3H$, OH, H, COOH, $NH_2$, COONHR, and $COONR_2$ groups (e.g., $CH_2CH_2$—$SO_3H$), y and z each independently represent an integer of 1 to 3 satisfying the relation of $2 \leq y+z \leq 4$.

The invention also provides liquid preparations, cyan ink compositions, and ink sets having cyan inks containing at least one dyestuff of the formula (I).

DETAILED DESCRIPTION OF THE INVENTION

The phthalocyanine dyes of the present invention are compounds represented by the above formula (1).

In the formula (I), a hydrogen atom on one of the four benzene rings in the phthalocyanine skeleton is substituted (at position X of formula (I)) with a linear compound having 6–10 atoms in length and containing C, O, and/or N. A suitable base (represented as $R_1$ in formula (I)) is covalently attached to the end of the linear compound in order to form a monomeric phthalocyanine species in solution. Suitable base compounds for attachment to the linear compound include pyridine, imidazole, sulfide, thiol, phenol, benzene, benzaldehyde, pyrimidine, pyrizine, triazine, thiazole, oxazole, pyridone, pyrone, pyrole, thiophene, furan, pyran, dioxane, and morpholine, and derivatives thereof.

The three hydrogen atoms on the remaining three benzene rings in the phthalocyanine skeleton may be substituted with by any other groups that will impart water solubility to the phthalocyanine derivative of the formula (I). Suitable substituents (represented as $R_2$ in formula (I)) include $SO_3H$, OH, COOH, $NH_2$, $COONHR_3$, $COONR_3$ (where $R_3$ is a substituted or unsubstituted alkyl group that contains a water solubilizing group (such as, e.g., COOH, OH, $SO_3H$, etc.) and the corresponding salts of COOH and $SO_3H$ groups (e.g., $Na^+$, $K^+$, $NH_4^+$). In addition, these water solubilizing groups can be of the formula Y-X, where Y represents an alkyl group and X represents $SO_3H$, OH, H, COOH, $NH_2$, COONHR, and $COONR_2$ groups (e.g., $CH_2CH_2-SO_3H$). Suitable substituents also include the combined linear compounds and attached bases described above (represented as $MR_1$). It is understood that the position of the aforementioned substitutions are not particularly limited.

In the compounds represented by the above formula (I), y and z be each independently represent an integer of 1 to 3, and they preferably satisfy the relation of $3 \leq y+z \leq 4$, and more preferably $y+z=4$. In a preferred embodiment of the invention, y is one and z is three.

The compounds represented by the above formula (I) to be contained in the ink formulations of the present invention have one or more hydrophilic groups (such as, e.g., $SO_3H$, SH, and OH) having strong affinity to organic solvents, such as a wetting agent. Accordingly, the compounds are highly soluble not only in water, but also in the aforementioned water-soluble organic solvents. Thus, notwithstanding prolonged contact with air and evaporation of water from the ink formulations or liquids, formation of a precipitate of the cyan dye of the present invention will be minimized or prevented. Consequently, clogging of the orifices of a recording head in the ink jet printer.

Specific examples of the dyes represented by the above formula (I) may include the dyes of No. 1 to No. 39 as set forth below.

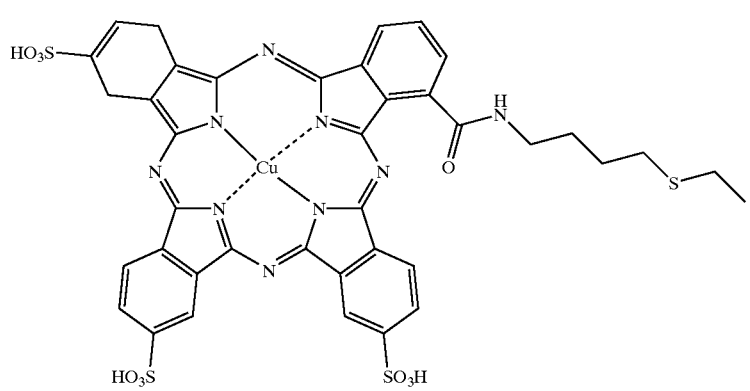

No. 1

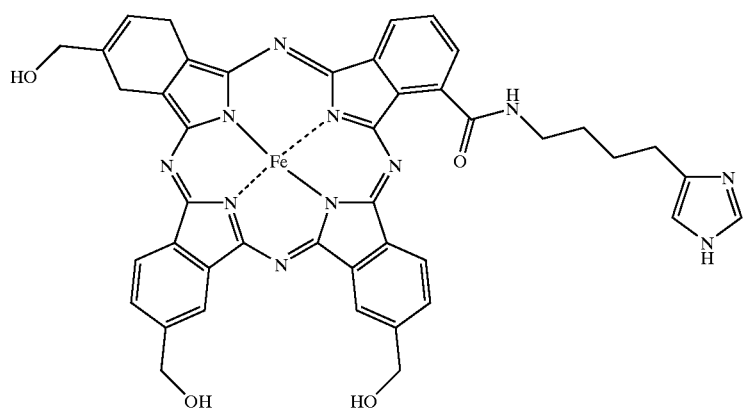

No. 2

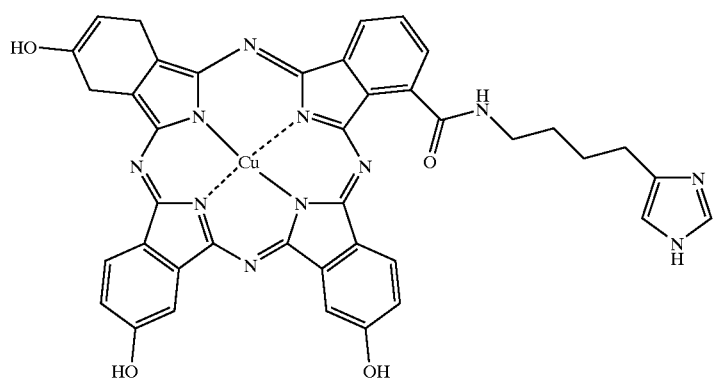

No. 3

No. 4
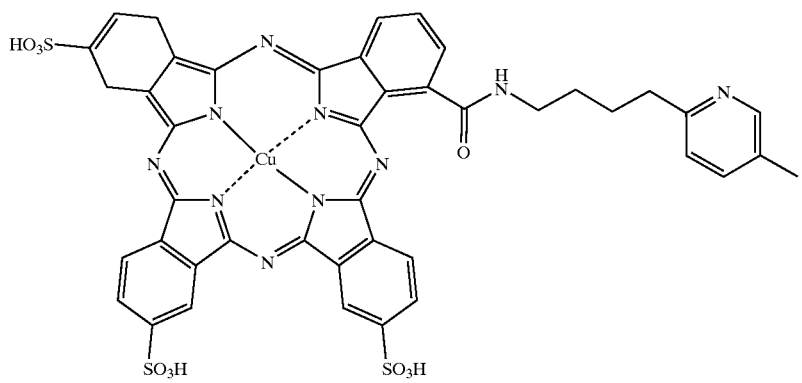
No. 5
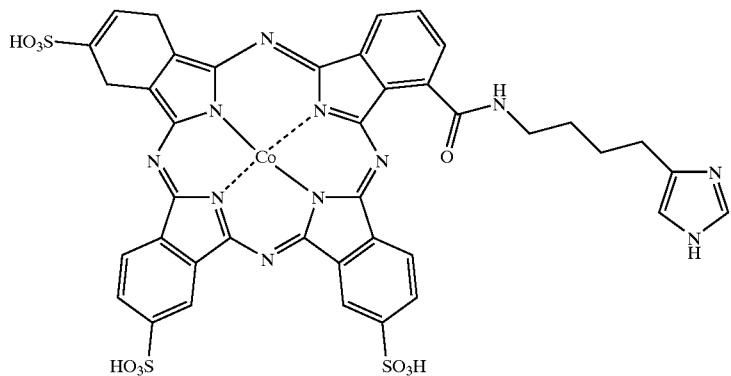
No. 6
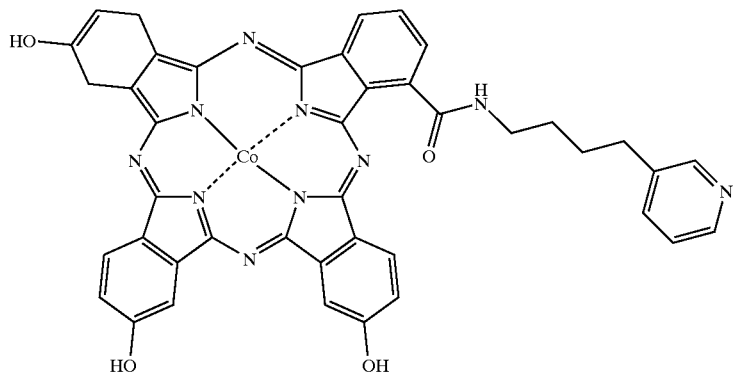
No. 7
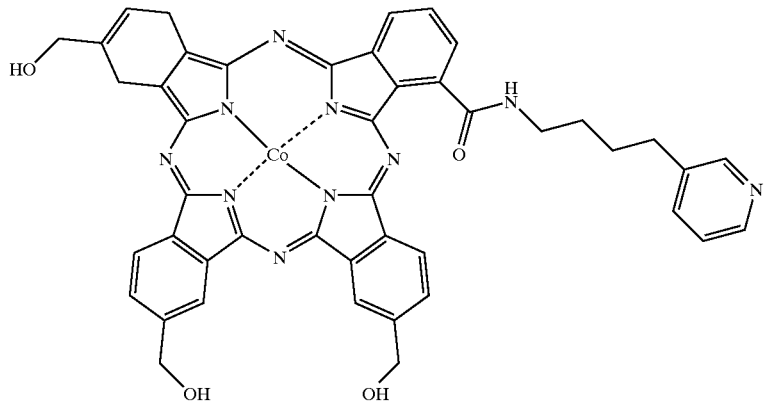

No. 8
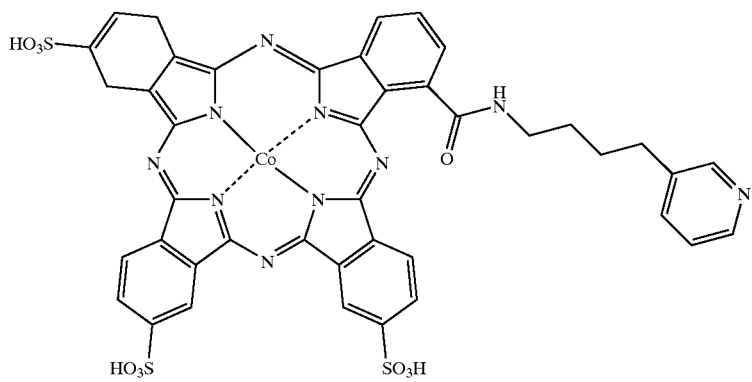
No. 9
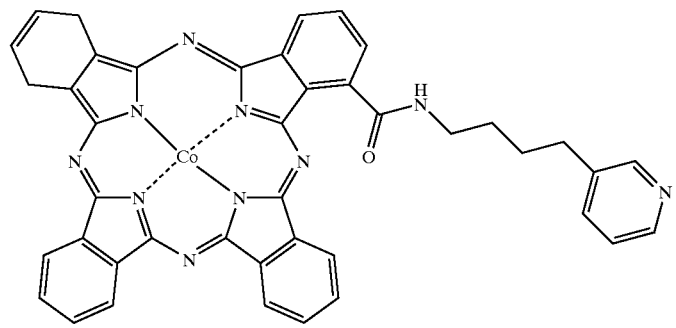
No. 10
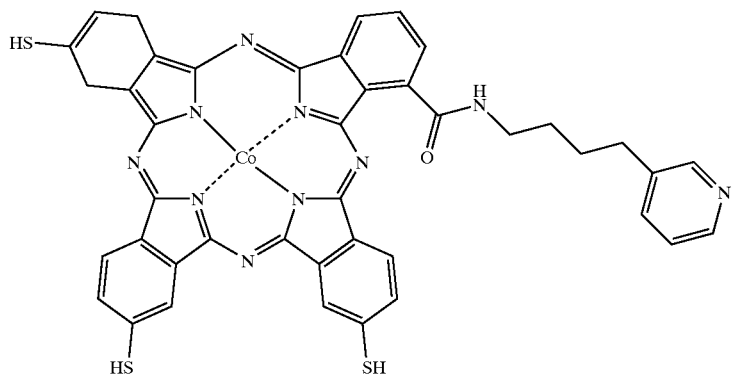
No. 11
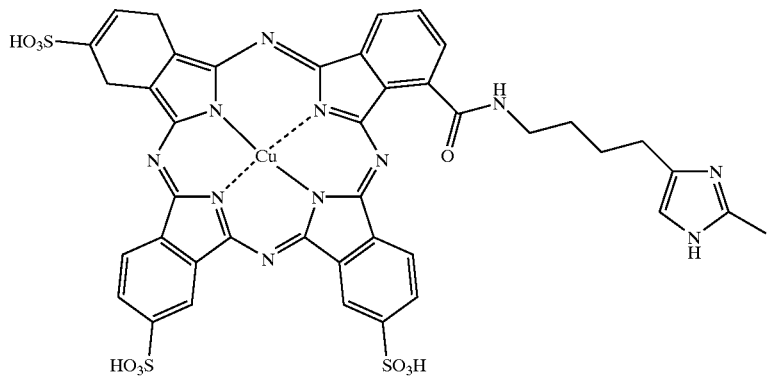

-continued
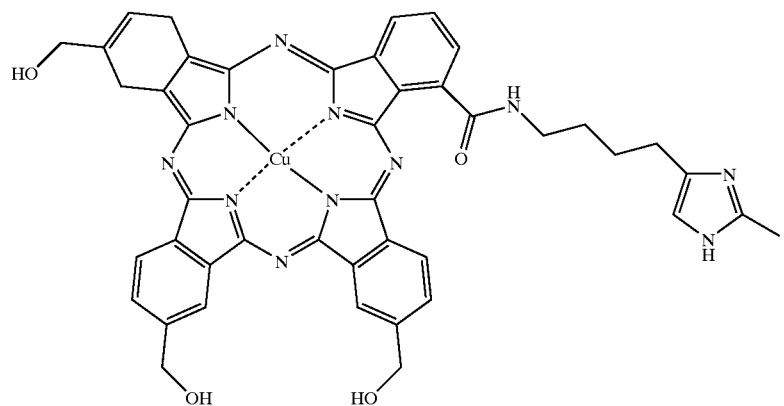
No. 12
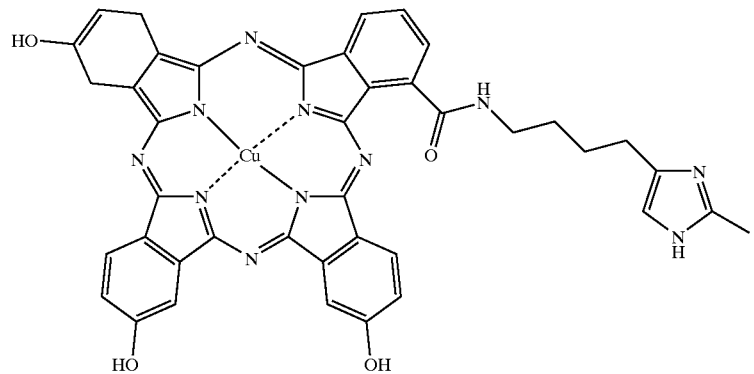
No. 13
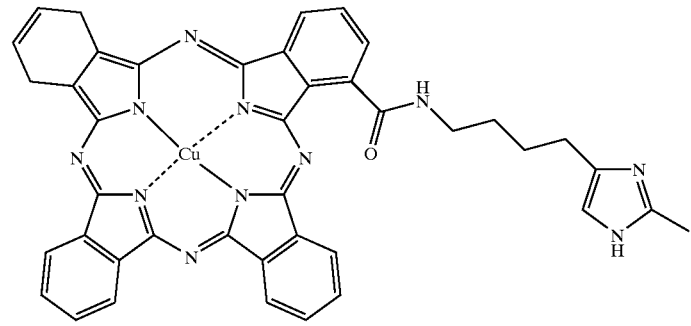
No. 14
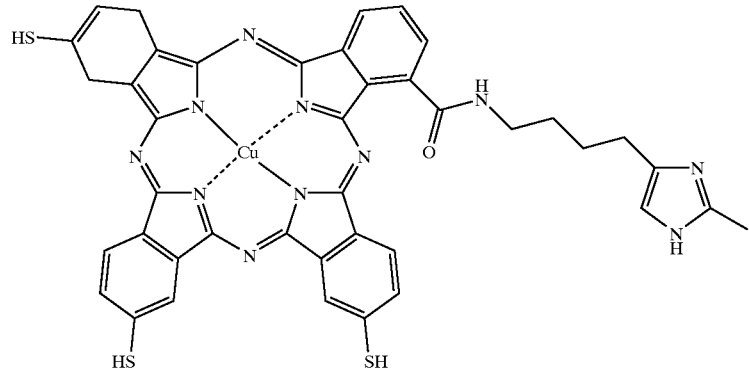
No. 15

No. 16
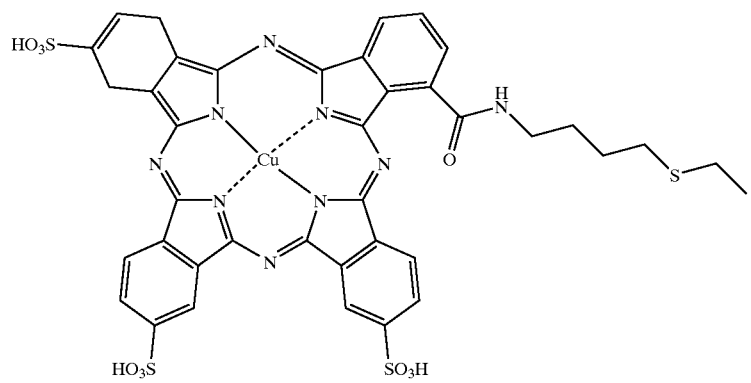
No. 17
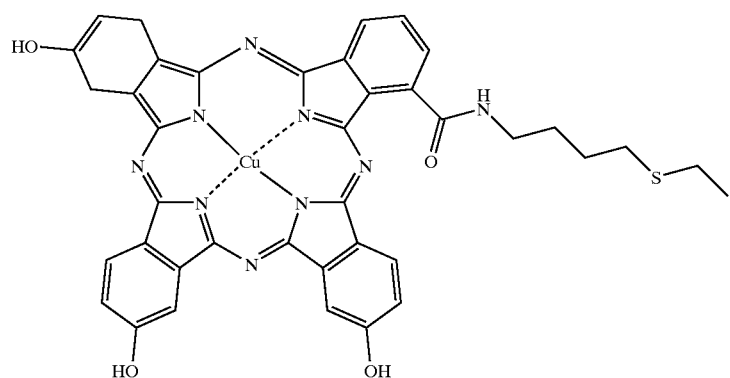
No. 18
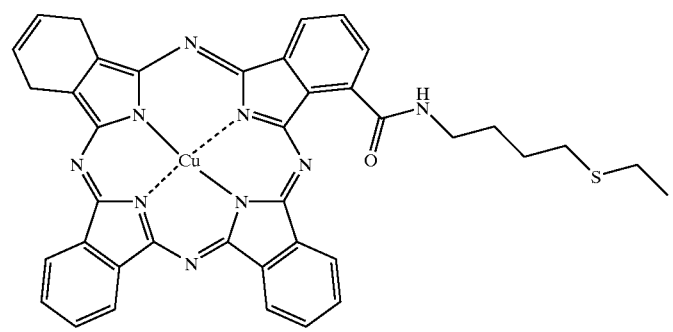
No. 19
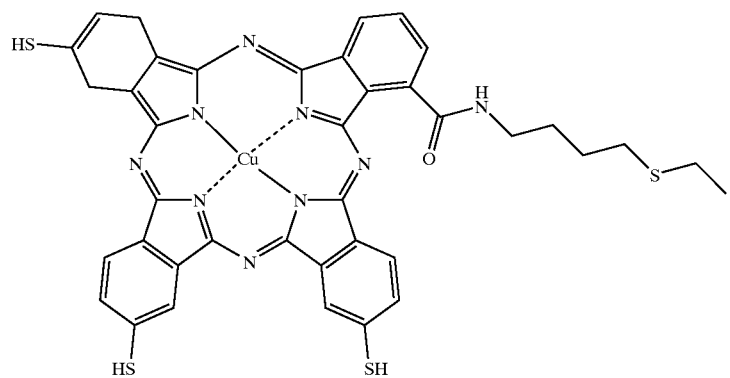

-continued
No. 20
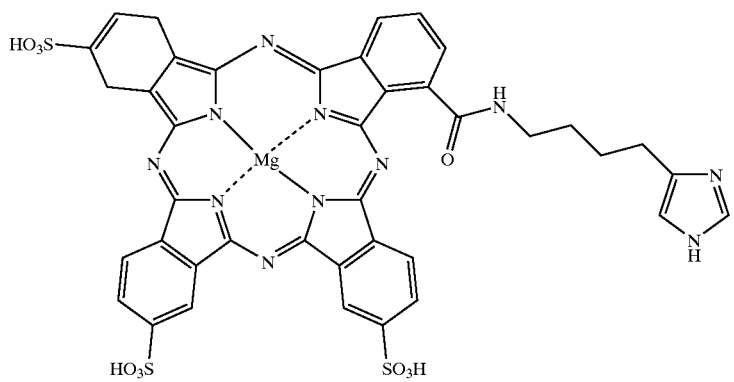
No. 21
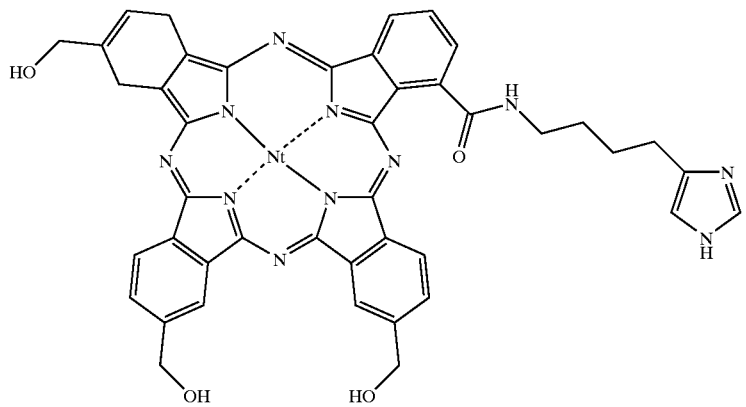
No. 22
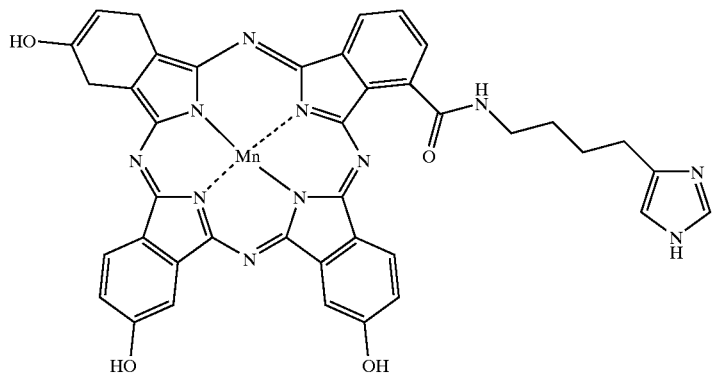
No. 23
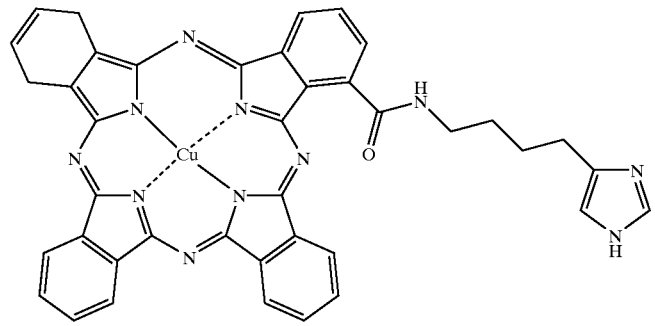

-continued
No. 24
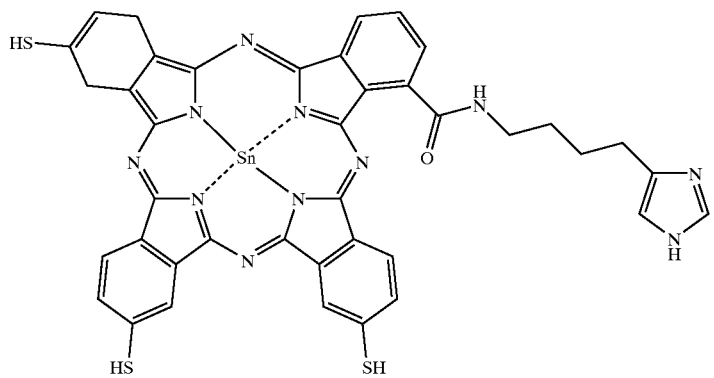
No. 25
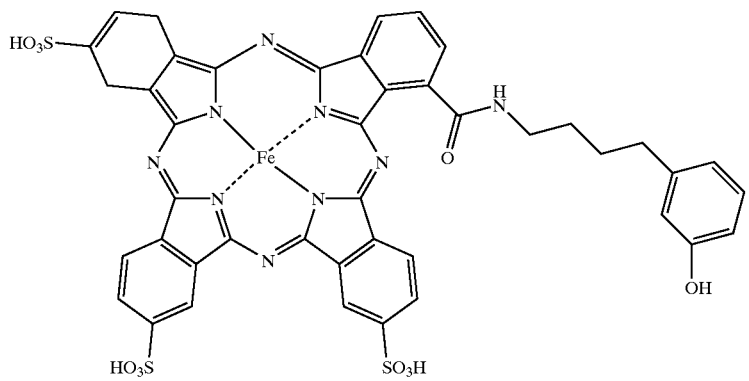
No. 26
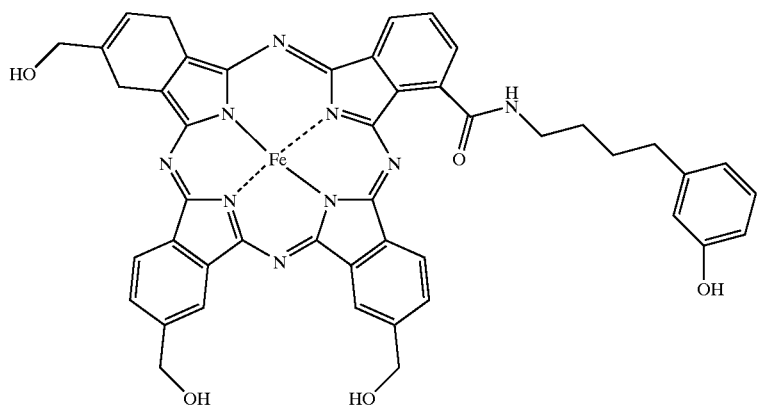
No. 27
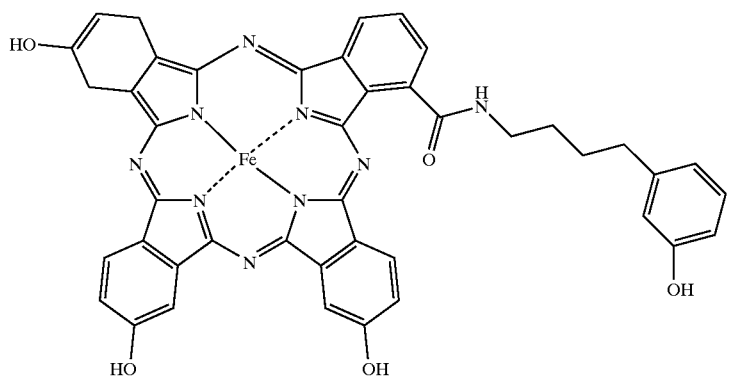

No. 28
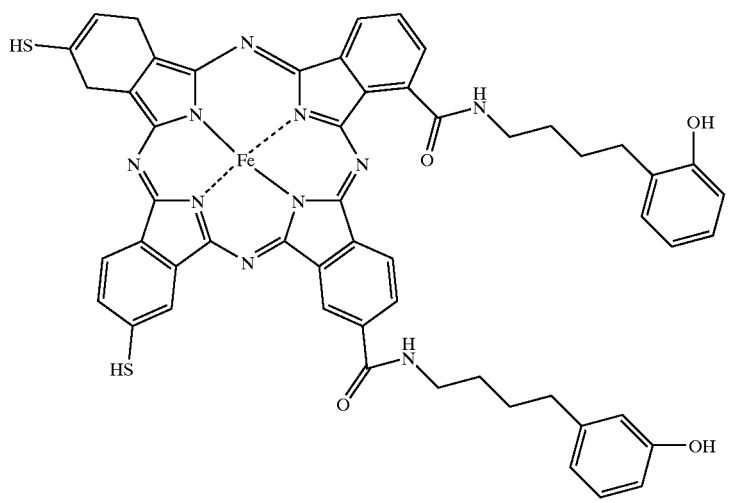
No. 29
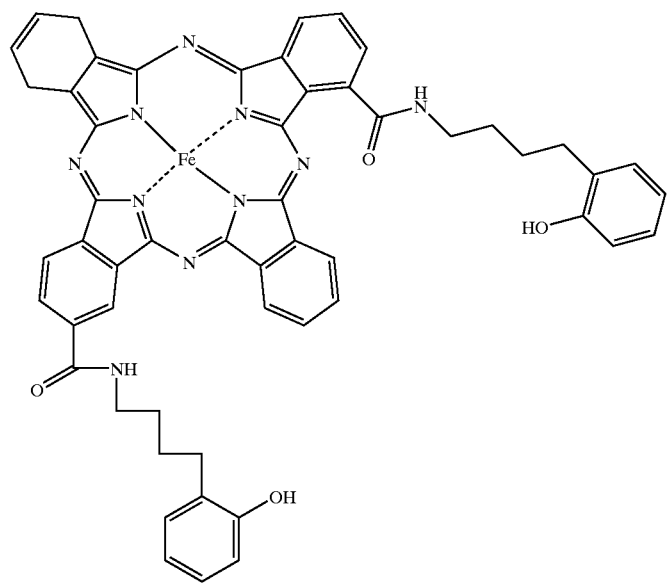
No. 30
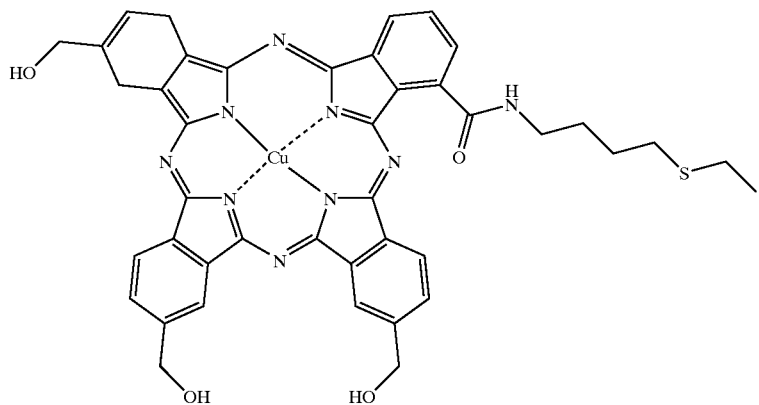

-continued
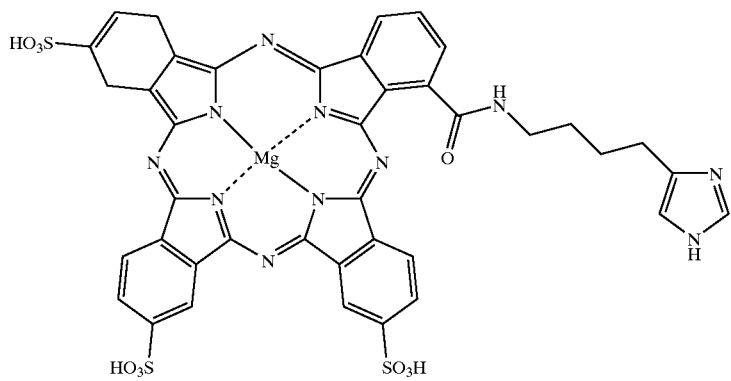
No. 31
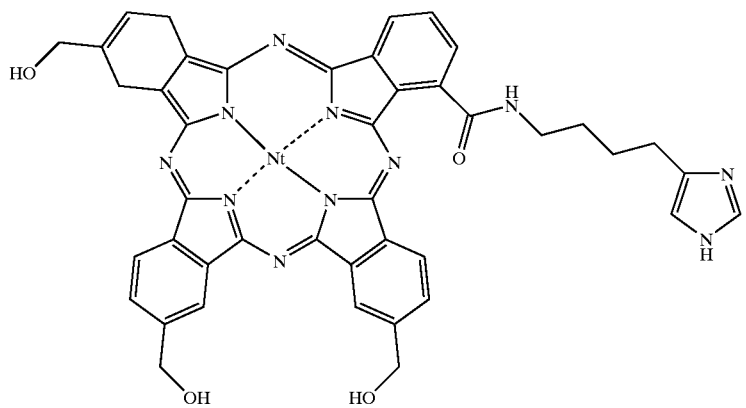
No. 32
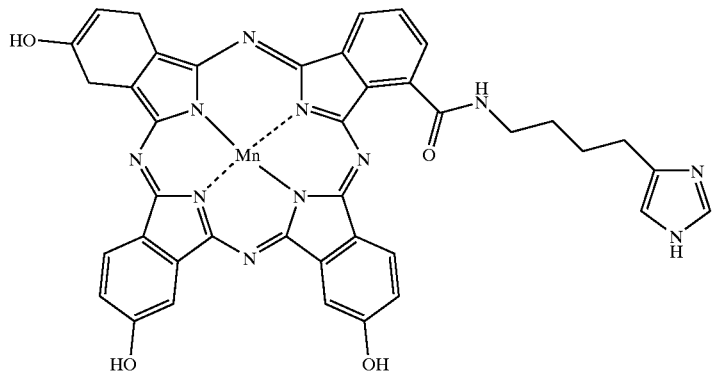
No. 33
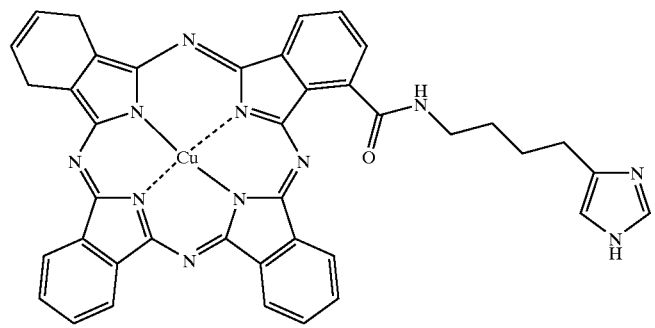
No. 34

-continued
No. 35
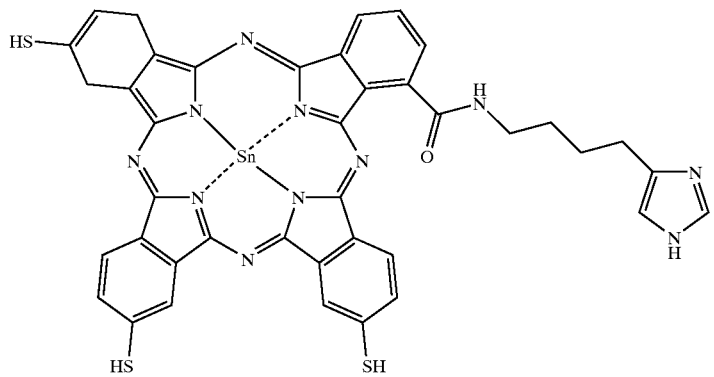
No. 36
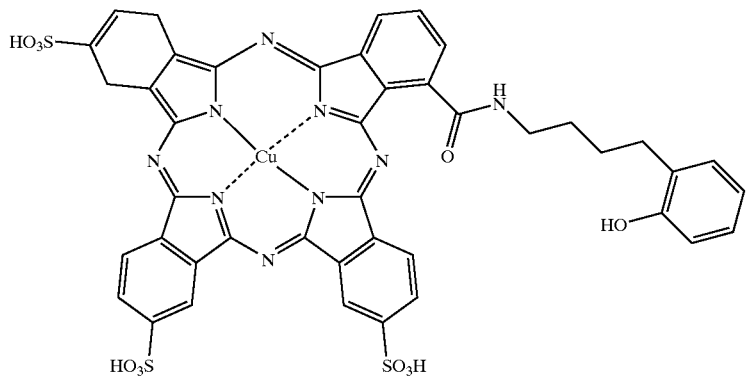
No. 37
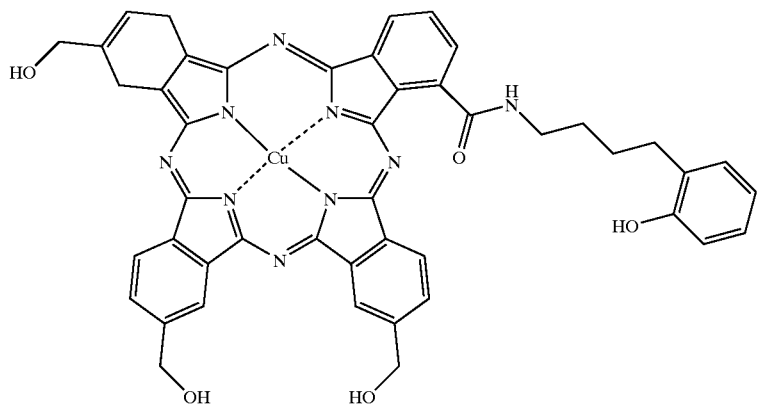

No. 38

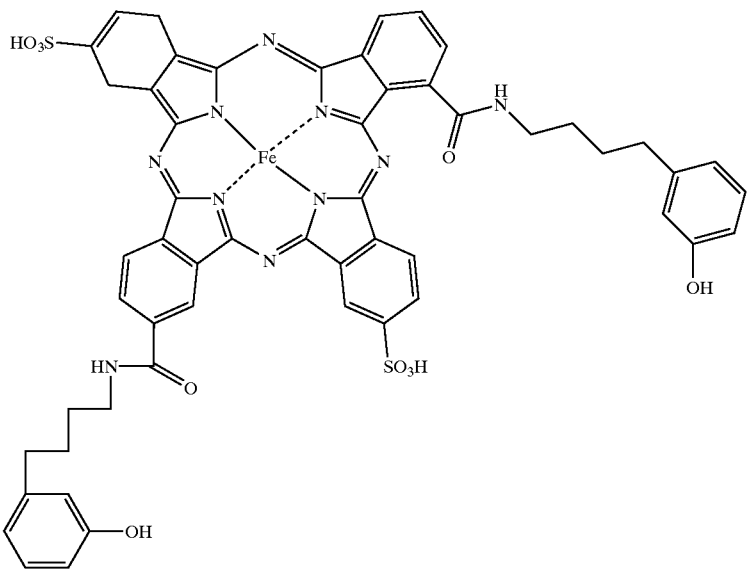

No. 39

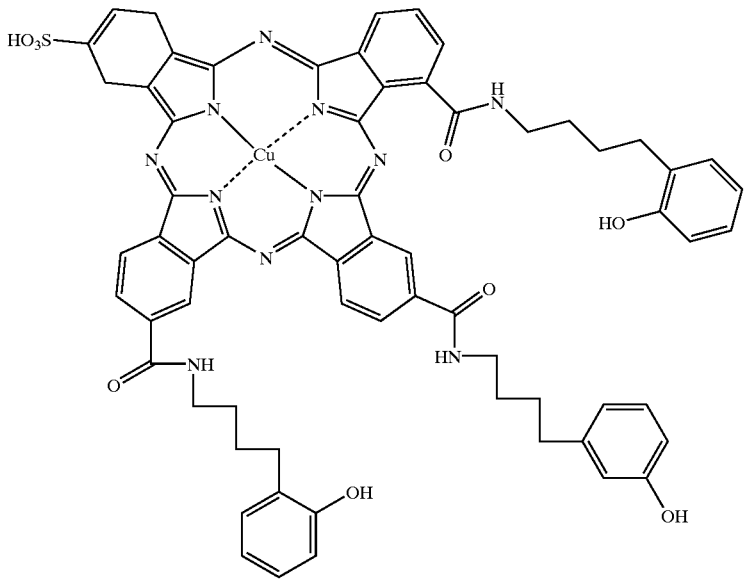

The dyes according to the invention are preferably aqueous solutions containing 0.1 to 20% by weight of dyestuff of the formula (I). The dyestuff preparation according to the invention can be prepared by dissolving at least one dyestuff of the formula (I) in water, if necessary with the addition of inorganic and/or organic bases. Alternatively, the synthesis solution or suspension formed during synthesis of the dyestuff can be converted into the dyestuff preparation according to the invention without isolating the dyestuff in-between, if necessary with the addition of inorganic and/or organic bases and, if necessary, water. In most cases, this can be done in the complete absence of solubility-improving organic additives.

Examples of inorganic and organic bases include: Hydroxides, carbonates and hydrogen carbonates of lithium, sodium, potassium, ammonium, such as, for example, lithium hydroxide, sodium hydroxide, potassium hydroxide, lithium carbonate, sodium carbonate, potassium carbonate; organic amines, such as monoethanol-, diethanol-, triethanol-, 3-propanol-, 2-propanol-, dipropanol-, diisopropanol-, tripropanol-, triisopropanol-, diethyl-, triethyl-, N-methylethanol-, N-methyldiethanol, N-ethyldiethanol-, N,N-dimethylethanol-, N,N-diethylethanol-, N-phenylethanolamine, 1-amino-2-propanol, 2-amino-1-propanol, N-2-hydroxyethyldiisopropanolamine, tris-N,N,N-[2-(2'-hydroxyethoxy)ethyl]amine or heterocyclic amines, such as, for example, morpholine or hydroxyethylmorpholine.

The bases used for adjusting the pH of the dyestuff preparation according to the invention are preferably alkali metal hydroxides that may already be present as a result of synthesis.

Furthermore, the invention provides printing inks containing at least one dyestuff of the formula (I) and processes for preparing the printing inks. Preferably, the printing inks according to the invention contain 0.1 to 20% by weight, more preferably 0.5 to 15% by weight, and most preferably 0.5 to 5% by weight, of the dyestuff of the formula (I), which may be in the form of the alkali metal salt or ammonium salt, dissolved in water and/or one or more organic solvents. The pH of the printing inks according to the invention can be between pH 4 and 13. Preferably, the printing inks have a pH of 5 to 10.

The printing inks according to the invention can contain customary additives, such as, for example, surfactants, fungicides or bactericides in the amounts customary for these additives. The printing inks according to the invention can contain up to 50% by weight of organic solvent. Preferably, they contain 0 to 30% by weight, particularly preferably 2 to 30% by weight.

Suitable organic solvents are in particular water-soluble organic solvents, such as, for example, alcohols, in particular $C_1$–$C_4$-alkanols, such as methanol, ethanol, n-propanol, isopronanol, n-butanol, sec.-butanol, tert.-butanol, isobutanol; pentanediols; carboxamides, such as, for example, formamides and dimethylacetamide; ketones or ketone alcohols, such as acetone and diacetone alcohols, cyclic esters, such as tetrahydrofuran and dioxane; nitrogen-containing heterocycles, such as 2-pyrrolidone, N-methyl-2-pyrrolidone and 1,3-dimethyl-2-imidazolidone; polyalkylene glycols, such as polyethylene glycol and polypropylene glycol; alkylene glycol and thioglycols containing $C_2$ $C_6$-alkylene units, such as ethylene glycol, propylene glycol, butylene glycol, triethylene glycol, thiodiglycol, hexylene glycol and diethylene glycol; other polyols, such as glycerol and 1,2,6-hexanetriol; alkyl ethers and polyalkyl ethers of alcohols such as 2-methoxyethanol, 2-(2-methoxy-ethoxy) ethanol, 2-(2-ethoxyethoxy) ethanol, 2-methoxy-2-ethoxy-2-ethoxyethanol, 2-[2-(2-methoxyethoxy)ethoxy]ethanol, and 2-[2-(2-ethoxyethoxy) ethoxy]ethanol, and sulfoxides and sulfones, in particular those having molecular weights of <200.

The printing inks according to the invention can contain, apart from the dyestuffs of the formula (I), also one or more dyestuffs customary for printing inks, which may serve, for example, for shading or coloring.

Examples of particularly suitable solvents are: ethylene glycol, diethylene glycol, triethylene glycol, 1,5-pentanediol, 2-hydroxyethyl acetate, 1-hydroxyethyl acetate, glycerol, 1,2-dihydroxypropane, 1-methoxy-2-propanol, 2-methoxy-1-propanol, N,N-dimethylformamide, pyrrolidone, N-methylpyrrolidone, ,-caprolactam, N-methyl-,-caprolactam, tetramethylurea, 1,3-dimethyl-2-imidazolidinone, N,N'-dimethylpropyleneurea, dimethyl sulfoxide, dimethyl sulfone, sulfolane, ethylene glycol, diethylene glycol, triethylene glycol, 1,2-dihydroxypropane, 1-ethoxy-2-hydroxy-propane, polyethylene glycols having molecular weights of up to 500, heterocyclic ketones, such as 2-pyrrolidone, N-methyl-2-pyrrolidone and 1,3-dimethyl-2-imidazolidone.

The printing inks according to this invention can be prepared by dissolving the salts of the dyestuffs of formula (I) in water and/or one or more of the above-mentioned organic solvents, if appropriate, at elevated temperature and, if appropriate, with the addition of the inorganic and/or organic bases mentioned. If desired, in addition customary ionic or non-ionic additives can be used, for example those enabling the viscosity to be lowered and/or the surface tension to be increased. Instead of the salts of formula (I), it is also possible to use the corresponding free acids in combination with at least equimolar amounts of the corresponding bases. The dyestuff of formula (I) used for preparing the printing inks according to the invention can first be purified, desalted and, if desired, concentrated by applying membrane processes, such as, for example, ultrafiltration, microfiltration, reverse osmosis or a combination thereof. The solutions or suspensions formed in the membrane processes mentioned can be used directly for preparing the printing inks according to the invention. However, it is also possible to convert the solutions or suspensions beforehand into solid formulations, for example by spray-drying.

It is also possible to convert the synthesis solution or suspension formed in the synthesis of the dyestuff according to the invention without isolating the dyestuff in-between or the dyestuff preparation according to this invention, if appropriate with addition of inorganic and/or organic bases or inorganic and/or organic solvents and water, into the printing inks according to the invention. The synthesis solution or suspension can, if desired, first be purified and desalted by applying membrane processes such as, for example, ultrafiltration, microfiltration and reverse osmosis or a combination thereof.

The invention also provides a process for printing substrates using an ink-jet recording system, a printing ink according to the invention being used as the recording fluid. The printing inks according to the invention are preferably used as recording fluids for ink-jet recording systems. Examples of ink-jet recording systems are ink-jet printers, such as thermal jet, bubble jet, piezo ink-jet or valve ink-jet. Preferred recording materials for ink-jet printers are paper, coated paper, and coated RC paper.

The ink-jet printing method is known per se. Generally, in this method, droplets of a writing fluid are expelled from one or more small nozzles and targeted in a specific manner at a support. Electronic modulation combines the individual droplets to give characters or graphic patterns. This requires that the ink interacts with the support, preferably paper. The ink should enter the paper without spreading too much or the printing quality will be adversely affected. The printed information must dry rapidly and be waterproof and rub-fast. Many inks possess some of the required properties at the cost of the other properties.

The recording fluids according to the invention have the following advantages. The physical properties, such as viscosity, surface tension and the like, are in the suitable ranges; the recording fluids do not block the small exit orifices of the ink-jet recording devices; they produce images of high density; storage does not lead to a change in physical properties and deposition of solid components in the recording fluid; the recording fluids are suitable for recording on a wide range of recording media without any limitations with respect to the type of recording media; and finally, the recording fluids are rapidly fixed and produce images having excellent water fastness, light fastness, wear resistance and resolution.

The ink compositions and dyes prepared from the components of the present invention for writing tool or the recording liquid for the so-called ink jet recording are well balanced in characteristics such as recording characteristics (signal response, stable formation of droplets, stable discharging, continuous recording ability for a long time, stable discharging after recording intermission for a long time), storage stability, solution stability of the recording agent, good fixing onto the recording member, and light resistance, weathering resistance, water resistance or alcohol resistance of the recorded images. For further improvement of such characteristics, various additives known in the art may be incorporated in the recording liquid.

The additives may include, for example, viscosity controlling agents such as polyvinyl alcohol, celluloses, and water-soluble resins; various surfactants such as cationic, anionic and nonionic surfactants; surface tension controlling agents such as diethanolamine, triethanolamine, etc.; pH controlling agents with the use of buffering agents; and others.

For preparing an ink composition to be used for printing of the type in which the ink composition is electrically charged, there may be employed agents for controlling specific resistance such as inorganic salts, including lithium chloride, ammonium chloride, sodium chloride and the like. Also, as a water retention improver at the tip of the discharging orifice, urea and thiourea may be preferably used. In printing methods where the ink composition is discharged by the action of heat, thermal physical properties (e.g. specific heat, coefficient of thermal expansion, thermal conductivity, etc.) may sometimes be adjusted.

The ink compositions and cyan dyes of the present invention have particularly excellent characteristics when employed in ink jet printing, but of course they can be used for usual writing tools such as fountain pens, felt pens, etc. which perform recording on a recording material such as paper.

Synthesis of Dye

In a pot reaction, phthalocyanine is combined with copper fluoride and an aqueous hydrogen peroxide solution to form a metallo-based phthalocyanine complex according to methods known in the art. The reaction is monitored by thin layer chromatography until the starting phthalocyanine has reacted. The solvent is removed under reduced pressure and the residue is extracted with $CH_2Cl_2$ and washed with water. A COOH group is then placed onto the benzene rings using oxalyl chloride and a $AlCl_3$ catalyst (or other methods as noted in Advanced Organic Chemistry, $4^{th}$ Edition, page 546 by J. March, the contents of which are incorporated by reference hereto). Treatment of this material with one equivalent of $PCl_5$ followed by reaction with 2-(-4-aminobutyl)imidazole results in the following compound, identified below as dye No. 40:

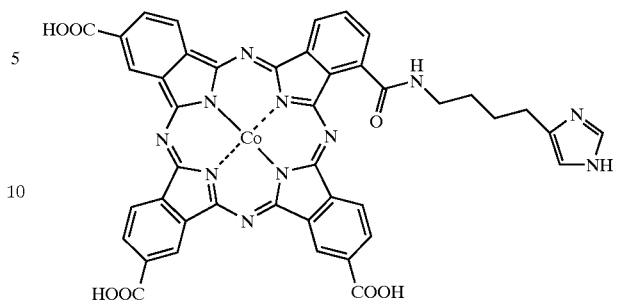

No. 40

An alternate synthesis would involve the reaction of substituted phthalonitriles with the desired metal ion to form a phthalocyanine directly having side groups that can be substituted to produce the chelated phthalocyanines, such as, for example:

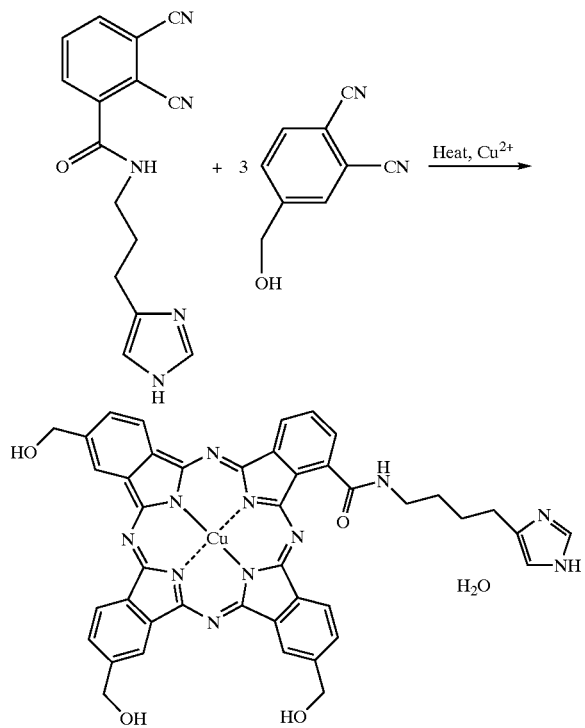

where M represents an ion of a metal selected from Cu, Fe, Co, Mg, Mn, Sn and Ni.

There are numerous other methods by which the present products may be synthesized. For example, it is well known in the art that other metals and acids may be used to create the metallo-phthalocyanine complex. See, e.g., Maya et al., J. Org. Chem. 2000, 65, 2733–2739; Sastre et al., J. Org. Chem. 1996, 61, 8591–8597, the contents of which are incorporated by reference hereto. Other processes such as those involving cross coupling reactions can also be used to form metallo-phthalocyanine complexes. Additionally, other hydrolysis, intramolecular and intermolecular reactions can be used to form substituents on the metallo-phthalocyanine complexes. The reaction mixture can also be heated by reflux followed by a treatment of lithium or acetone for the substituents to be added to the base complex. Furthermore, metallic salts may also be used to facilitate condensation in order to obtain the corresponding metallo-phthalocyanine complex. It is understood that the aforementioned synthesis techniques are well known in the art and are intended to be merely representative of particular methods that can be used to produce the current invention.

What is claimed is:

1. An ink comprising a dye, water, and a water-soluble organic solvent, wherein said dye comprises at least one of the dyes represented by the following general formula (I):

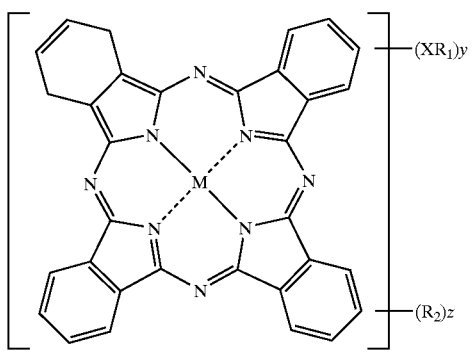

wherein
- M represents an ion of a metal selected from the group consisting of Cu, Fe, Co, Mg, Mn, Sn and Ni,
- X represents a linear compound having 6–10 atoms in length containing C, O, and/or N,
- $R_1$ represents pyridine, imidazole, sulfide, thiol, phenol, benzene, benzaldehyde, pyrimidine, pyrizine, triazine, thiazole, oxazole, pyridone, pyrone, pyrole, thiophene, furan, pyran, dioxane, and morpholine, and derivatives thereof,
- $R_2$ represents an atom or chemical group that imparts water solubility to the phthalocyanine cyan dye, and
- y and z each independently represent an integer of 1 to 3 satisfying the relation of $2 \leq y+z \leq 4$.

2. The ink of claim 1, wherein y and z satisfy the relation of $3 \leq y+z \leq 4$.

3. The ink of claim 1, wherein y and z satisfy the relation of $y+z=4$.

4. The ink of claim 1, wherein said atom or chemical group comprises a member of the group selected from $SO_3H$, OH, H, $NH_2$, COOH, $COONR_3$, $COONHR_3$, wherein $R_3$ comprises a substituted and unsubstituted alkyl group that contains a water solubilizing group, and the corresponding salts thereof.

5. The ink of claim 1, wherein $R_1$ represents pyridine.

6. The ink of claim 1, wherein $R_1$ represents imidazole.

7. The ink of claim 1, wherein each $R_2$ individually represents $SO_3H$.

8. The ink of claim 1, wherein X represents a linear compound having 7–8 atoms in length.

9. The ink of claim 1, wherein the dye is contained in an amount of from 0.1 to 20% by weight based on the total weight of the ink.

10. The ink of claim 1, wherein the dye is contained in an amount of from 0.5 to 5% by weight based on the total weight of the ink.

11. A process for printing substrates with a recording liquid using an ink-jet printing system, comprising, providing an ink comprising a dye, water, and a water-soluble organic solvent. wherein said dye comprises at least one of the dyes represented by the following general formula (I):

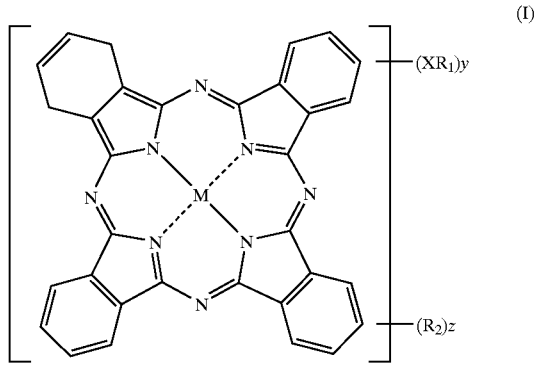

wherein
- M represents an ion of a metal selected from the group consisting of Cu, Fe, Co, Mg, Mn, Sn and Ni,
- X represents a linear compound having 6–10 atoms in length containing C, O, and/or N,
- $R_1$ represents pyridine, imidazole, sulfide, thiol, phenol, benzene, benzaldehyde, pyrimidine, pyrizine, triazine, thiazole, oxazole, pyridone, pyrone, pyrole, thiophene, furan, pyran, dioxane, and morpholine, and derivates thereof,
- $R_2$ represents an atom or chemical group that imparts water solubility to the phthalocyanine cyan dye, and
- y and z each independently represent an integer of 1 to 3 satisfying the relation of $2 \leq y+z \leq 4$; and applying the ink onto a print medium.

* * * * *